United States Patent Office.

HENRY WURTZ, OF NEW YORK, N. Y.

*Letters Patent No. 74,188, dated February 4, 1868.*

IMPROVED MODE OF COMPOUNDING PRINTERS' INK FROM GRAHAMITE.

*The Schedule referred to in these Letters Patent and making part of the same.*

TO ALL WHOM IT MAY CONCERN:

Be it known that I, HENRY WURTZ, of New York, in the county of New York, in the State of New York, have invented a new and improved Mode of Compounding Printers' Inks made from Grahamite; and I do hereby declare that the following is a full and exact description thereof.

*Description.*

The nature of my invention consists in an improved modification of my already-patented method of compounding printing-inks, which is specified and claimed in my patent, No. 67,697, dated August 13, 1867, being a combination of the invention there described with another invention, covered by two applications, filed by me on the 24th of July, 1867, (and at this date ordered to issue,) these two applications being numbered by me, provisionally, Nos. 3 and 5, and covering a certain new material or constituent, first discovered by me in Grahamite, and the modes of extracting the same therefrom, which new material is therein named by me Alpha Resinoid of Grahamite, or Viscosine. It is herein and hereafter to be known and designated by the name Viscosine.

The improvement herein to be specified consists in increasing the adhesiveness, viscosity, and drying-quality of Grahamite printing-inks, by increasing the proportion of viscosine contained therein, or by substituting, wholly or partially, for raw Grahamite, in compounding the same, the pure resinoid viscosine.

In order to enable those skilled in the art of compounding printing-inks to practise and make use of my inventions, I shall proceed to describe my modes of operation.

The methods of preparing viscosine have been fully set forth in my previous patents and applications; but some remarks may be here introduced especially applicable to printing-inks. Complete purity of the viscosine being for this purpose not essential, it is desirable to use the cheaper solvents of viscosine in extracting it from the Grahamite. These are, at present, petroleums, petroleum-naphthas, (including "benzines" and "gasolines,") and cold oil of turpentine. In consequence, however, of the property which irisine (the Beta resinoid of Grahamite) has of swelling up and gradually dissolving in some petroleums, and in oil of turpentine, petroleum-naphtha is generally preferable. All petroleum-naphthas, however, do not dissolve viscosine out of its mineral gangue with equal readiness, and the proper quality must be selected by experiment, by agitation with a pinch of powdered Grahamite of the brilliant variety. If the sample becomes quickly colored brown, it is suited to the purpose. Sometimes a sample of such naphtha which does not readily take up the viscosine may be made to do so by mixing with it a little oil of turpentine, or other stronger solvent, which will act slightly upon the irisine, the presence of some irisine in the viscosine being generally unimportant for this purpose. Also, in the separation of the solvent from the viscosine by distillation, it is neither necessary nor generally desirable to be exact, or to carry the distillation to the point of complete separation, and cause the *caput mortuum,* or residuum in the still, to become solid, because, in that case, it is more difficult to remove it from the still; and, moreover, in compounding inks, it must, in that case, be again dissolved or softened. In most cases, the retention, by the residuum in the still, of a sufficient portion of the solvent to give the viscosine fluidity enough (while hot) to flow readily from the still will be advantageous in the subsequent preparation of inks.

I have found that the glossy or brilliant variety of the mineral, which forms much the larger proportion of the Grahamite vein, (to the exclusion of the dull variety, forming usually the central portion of the vein,) affords much more viscosine, of a better quality for inks and some other uses.

Viscosine is the constituent used by me, in my new methods of compounding printing-inks, for giving body, adhesiveness, drying-power, and lustre, to all printing-inks; and, by its means, almost every common oily substance which is not naturally too volatile may be made a suitable medium for thinning and compounding the usual pigments to produce inks possessing the finest qualities, being, for this purpose, much superior to Grahamite as a whole, used as specified in my patent, No. 67,697, as aforesaid. In compounding it with such oils, I have sometimes found it advantageous to use an expedient, set forth already in another application, now allowed and waiting issue, dated September 28, 1867, (numbered by me, provisionally, No. 9,) which is to introduce the oil into the still, with the solution of viscosine, previous to or during the separation of the solvent by distillation. The residuum then flows readily from the still, and is at once in condition for immediate compounding with lamp-black or other pigments to form inks. The modes of compounding are the same as those in common use with other materials, and well known to those skilled in the art.

Among the oils which I have used in compounding inks with viscosine, I may mention crude petroleums, rosin oils, and the oils obtained by the distillation of the Grahamite itself, (both crude and refined,) as well as the common commercial mixed oils used in compounding common printers' inks.

In compounding the very finest qualities of inks, I have sometimes communicated greater hardness and permanence to the ink after drying by adding a resinous or other substance in small quantities, such as caoutchouc or gutta percha, rosin, gum-damar, sandarac, &c. Viscosine is also susceptible of being compounded, for this and other purposes, with crude turpentine, coal-tar, copal, mastic, &c.

The proportions in which the new ingredient, viscosine, is to be used in inks, it is unnecessary to specify, as they will vary with the result required, and will be varied at the option of the manufacturer or consumer. Large proportions of viscosine will communicate high lustre, but may then increase the drying-quality of the ink, so as to render it difficult to work, in which case this must be rectified by addition of suitable oils, such as are familiar to makers of inks. The oil distilled from the Grahamite itself has been found very suitable for this purpose.

Additional lustre may be imparted to a certain degree, without undue increase of drying-quality, by using, instead of a portion of the lamp-black or other pigment, some of the raw Grahamite, or some of the irisine extracted therefrom by methods specified by me in other patents. Compositions will thus be formed intermediate in character between a pure viscosine ink and such inks as are described in my patent, No. 67,697

As an example of such an ink-composition, from which the most unexceptionable results have been obtained, the following may be given, being one of those of which samples are herewith filed: five ounces crude Grahamite oil, (distilled by steam;) four ounces lamp-black; seven ounces solid viscosine, extracted by petroleum-naphtha.

*Claim.*

What I claim as my invention, and desire to secure by Letters Patent, is—

The use, as an ingredient in printing-inks, of the resinous constituent of the Grahamite of West Virginia, called by me viscosine.

In testimony wherof, I have hereunto set my signature, in the presence of two witnesses, in the city of New York, this twenty-first day of January, 1868.

HENRY WURTZ.

Witnesses:
L. A. SYKES,
A. H. WURTZ.